United States Patent [19]

Heiman

[11] Patent Number: 5,426,652
[45] Date of Patent: Jun. 20, 1995

[54] DATA RECEPTION TECHNIQUE

[75] Inventor: Arie Heiman, Ra'anana, Israel

[73] Assignee: The DSP Group Inc., San Jose, Calif.

[21] Appl. No.: 639,674

[22] Filed: Jan. 8, 1991

[51] Int. Cl.$^6$ ............................................. G06F 11/00
[52] U.S. Cl. ...................................... 371/30; 371/37.1
[58] Field of Search ........................ 371/37.1, 37.2, 31, 371/11.2, 35, 20.1, 7.1, 67.1, 68.2; 364/265.1; 358/442, 468; 375/8, 10, 59, 75, 30

[56] References Cited

U.S. PATENT DOCUMENTS

| | | | |
|---|---|---|---|
| 3,656,107 | 4/1972 | Hsiao et al. | 340/146.1 |
| 3,940,736 | 2/1976 | Inaba et al. | |
| 4,163,147 | 7/1979 | Scheuneman et al. | 235/312 |
| 4,291,405 | 9/1981 | Jayant et al. | |
| 4,319,357 | 3/1982 | Bossen | 371/38 |
| 4,329,708 | 5/1982 | Yamamoto et al. | |
| 4,375,581 | 3/1983 | Jayant . | |
| 4,605,921 | 8/1986 | Riddle et al. | 340/347 DD |
| 4,802,117 | 1/1989 | Chrosny et al. | |
| 4,864,244 | 9/1989 | Sasaki . | |
| 4,942,592 | 7/1990 | Leitch et al. | |
| 4,982,401 | 1/1991 | Box | 371/2.1 |
| 5,010,554 | 4/1991 | Bechtel et al. | 371/37.1 |
| 5,077,742 | 12/1991 | Tsumura et al. | 371/32 |

OTHER PUBLICATIONS

B. Sklar *Digital Communications: Fundamentals and Applications,* Prentice Hall, New Jersey, 1988, pp. 262–263.

Primary Examiner—Robert W. Beausoliel, Jr.
Assistant Examiner—Phung M. Chung
Attorney, Agent, or Firm—Ladas & Parry

[57] ABSTRACT

A data reception apparatus and technique for use with a modem and including the functions of receiving via the modem a signal including a plurality of datapoints and including therein desired data and inherently redundant data, wherein upon reception of each datapoint, the modem produces quality information regarding how accurately the datapoint was received and identifying and correcting errors introduced into the signal through use of the inherently redundant data and the quality information.

5 Claims, 3 Drawing Sheets

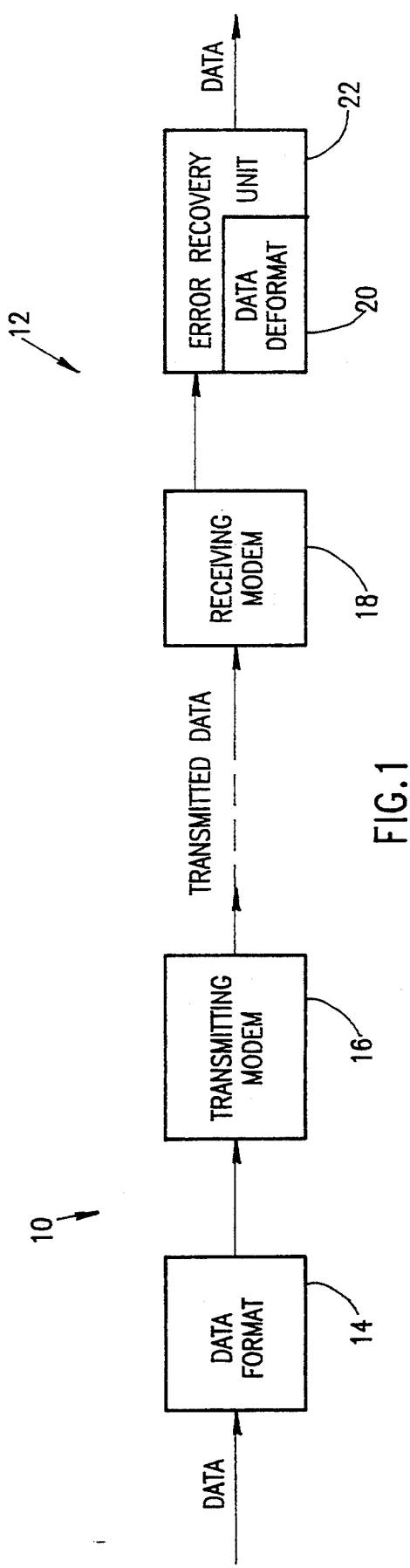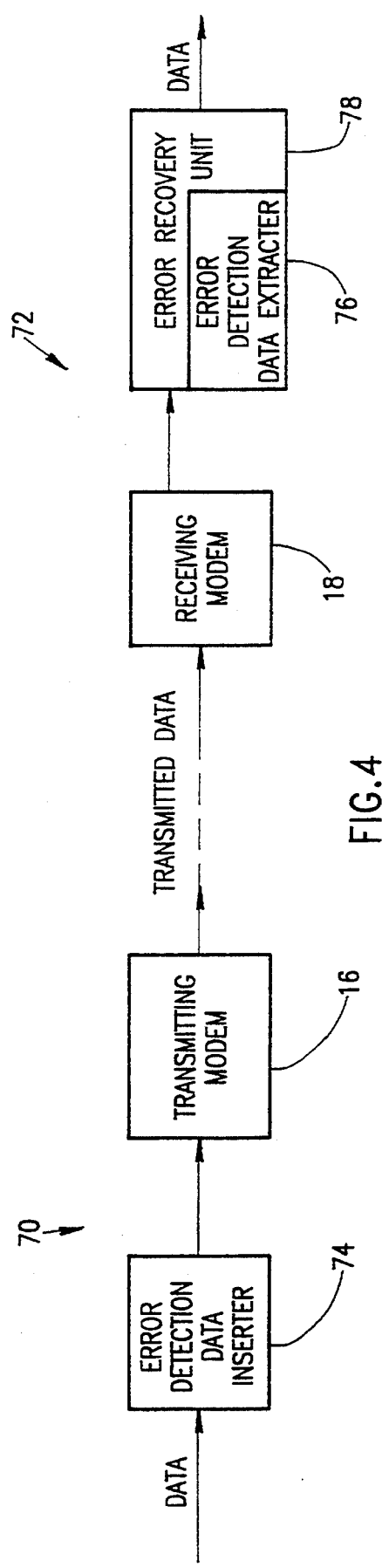

```
            While (start=1 ; i .LT. end_data )
            {
STEP 50
            SP(i)=get_symbol_and_phasor_from_modem(i);
            test= test_the_quality_of_symbol(SP(i));
            if (test == fail)
            {
STEP 52
                second(i)=calculate_second_best(SP(i));
                like_sec(i)=calculate_second_best_like(SP(i));
            }
            else
            {                                              FIG.3
STEP 54
                second(i)=best(i);
                like_sec(i)=small_number;
            }
STEP 56
            test1=check_for_consistency (sy(start),,,,,,,sy(i));
            if (test1==fail)
            {
STEP 58
                While (try_num=1;try_num. LT. Max_try; try++)
                {
                    1_vector = locate_most_likely_erroneous_symbols
                                (second(r),like_sec(r) ; r=start,i );
                    sy(1_vector)=
                replace_most_like_erroneous_by_the_second_bests
                        (second(1_vector));
                    test1=check_for_consistency(sy(start),,,sy(i));
                    if (test1==fail) Replace_back_first_best(
                                    1_vector);
                }
            else
                start=i ; up to that location the symbols are
                            corrected or received correctly
            }
```

DATA RECEPTION TECHNIQUE

FIELD OF THE INVENTION

The present invention relates to data reception techniques generally and to data reception techniques using inherent redundancy in received data fop error recovery in particular.

BACKGROUND OF THE INVENTION

The transmission of digital data through channels, such as recording devices and data links, is known in the art. If errors are introduced in the data at any time during transmission through the channels, the received data is corrupted.

As is known in the art, the corrupt data is either no longer useful, such as is the case for corrupted bank account data, or is useful but with a significant decrease in the quality of the data, such as is the case for documents or images typically received by a facsimile machines.

Two well-known techniques are utilized to overcome the problem of introduction of errors in received data. They are error correction techniques and error detection techniques combined with data packetization.

In error correction techniques, redundant bits are added to the original data stream before transmission. If errors are introduced to the data, the error correction technique utilizes the redundant bits as well as the original data to correct the error. The quality of the correction depends on the type of error correcting algorithm as well as the number of redundant bits added.

In error detection techniques, the data is partitioned into packets to which are added redundant bits. The redundant bit is used to detect if errors have been added to the data in the packet. If an error is detected, the packet is retransmitted.

Both the error detection and the error correction techniques require the addition of redundant bits to the data to be transmitted. Recovery from errors is either by retransmission of the data with the errors or through utilization of data in the added redundant bits. It will be appreciated that addition of the redundant bits adds to the amount of data to be transmitted.

SUMMARY OF THE INVENTION

It is therefore an object of the present invention to provide a data reception system which utilizes modem information and redundant data which is inherent in the received data to effect error recovery.

There is therefore provided, in accordance with an embodiment of the present invention, a data reception system including a modem for receiving transmitted data including inherent redundant data and for providing received data and information regarding the received data and error recovery apparatus operating on the received data for utilizing the inherent redundant data and the information regarding the received data to identify and to correct errors introduced into the received data.

Additionally, in accordance with an embodiment of the present invention, the error recovery apparatus includes apparatus for identifying a plurality of suspected erroneous datapoints in the received data and apparatus for checking that the inherent redundant data is consistent with the received data wherein an inconsistent result indicates that a First value of at least one of the suspected erroneous datapoints is incorrect. The error recovery apparatus also includes apparatus for replacing the first value with a second possible value wherein the second possible value is different from the first value, apparatus for repeating the steps of checking and replacing with at least a portion of the suspected erroneous datapoints until either the received data is consistent with the inherent redundant data or no suspected erroneous datapoints remain and apparatus for returning the at least one suspected erroneous datapoint to the first value if the result of the step of checking is inconsistent.

Furthermore, in accordance with an embodiment of the present invention, the inherent redundant data is one of the following data types: illegal code words, end-of-line (EOL) indications, error detection bits or inherent correlation in a transmitted image.

Still further, in accordance with an embodiment of the present invention, the error recovery apparatus operates on one segment of data at a time.

There is further provided, in accordance with an embodiment of the present invention, a facsimile system including the elements of the data reception system.

There is additionally provided, in accordance with an embodiment of the present invention, a data reception technique including the steps of receiving via modem means transmitted data including inherent redundant data and providing received data, providing from the modem means information regarding the received data and utilizing the inherent redundant data and the information regarding the received data to identify and to correct errors introduced into the data.

Finally, in accordance with the present invention, the step of utilizing includes the steps of identifying a plurality of suspected erroneous datapoints in the received data, checking that the inherent redundant data is consistent with the received data wherein an inconsistent result indicates that a first value of at least one of the suspected erroneous datapoints is incorrect, replacing the first value with a second possible value wherein the second possible value is different from the first value, repeating the steps of checking and replacing with at least a portion of the suspected erroneous datapoints until either the received data is consistent with the inherent redundant data or no suspected erroneous datapoints remain and returning the at least one suspected erroneous datapoint to the first value if the result of the step of checking is inconsistent.

BRIEF DESCRIPTION OF THE DRAWINGS

The present invention will be understood and appreciated more fully from the following detailed description taken in conjunction with the drawings in which:

FIG. 1 is a block diagram illustration of a transmission and a data reception system constructed and operative in accordance with one embodiment of the present invention;

FIG. 3 is a pseudocode illustration of the operation an error recovery unit of the system of FIG. 1; and FIG. 4 is a block diagram illustration of a transmission system and a data reception system constructed and operative in accordance with an alternative embodiment of the present invention.

DETAILED DESCRIPTION OF PRESENT INVENTION

Figure 2:
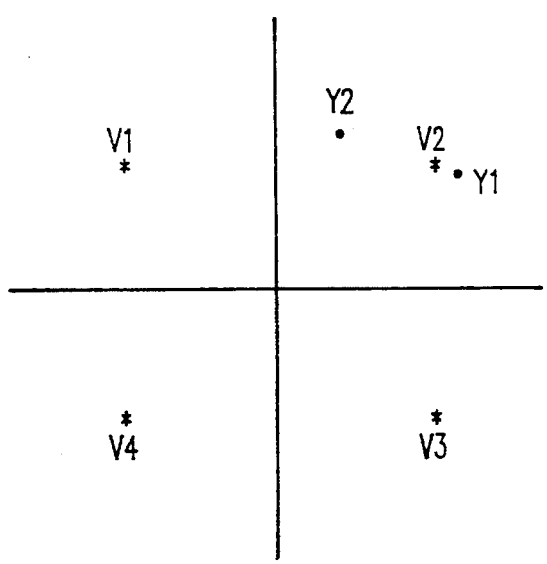
FIG. 2 is a graphical illustration of an example four phase Quadrature Amplification Modulation (QAM) phasor coordinate system useful in understanding the operation of the system of FIG. 1.

Reference is now made to FIG. 1 which illustrates a transmission system 10 and a data reception system 12 constructed and operative in accordance with an embodiment of the present invention. The transmission system 10 is operative fop preparing and transmitting data to be transmitted and data reception system 12 is operative fop receiving the transmitted data and for recovering most of the data into which errors have been introduced.

The transmission system 10 typically comprises a data format unit 14 for preparing data to be transmitted in a suitable format for transmission, such as by compressing the data, by packetizing it, and/of by adding End-Of-Line (EOL), End-Of-Page (EOP) or End-Of-Block (EOB) or other such indications. The transmission system 10 also comprises a transmitting modem 16 For collecting the data to be transmitted from the data format unit 14 and for transmitting the data to be transmitted. A typical data format unit 14 typically implements within communication software a communication protocol, such as CCITT Recommendations T4 and T6 for facsimile machines. An example transmitting modem 16 is one which performs QAM modulation and operates in accordance with one of CCITT Standards V22, V27, V29 or V32 however, any suitable modem can be utilized.

The reception system 12 typically comprises a receiving modem 18 for receiving the transmitted data, and an error recovery unit 22, working with information received from the receiving modem 18, for recovering data received in error. The error recovery unit 22 typically includes a data deformat unit 20 for reversing the operation performed by the format unit 14 which typically implements the communication protocol implemented by data format unit 14. A typical receiving modem 18 typically operates the same protocol as transmitting modem 16.

As is known in the art of QAM modulation, the receiving modem 18 receives phasors and defines them by the symbols which they most closely match, where a symbol typically is at least one bit off data. An example "closeness" measure is the Euclidian distance but any suitable measure can be used. This process is illustrated for a four phase QAM modem in FIG. 2, to which reference is now briefly made, where Y1 is an example received phasor. V2 is the symbol which matches Y1 and thus, is the symbol produced by receiving modem 18 when Y1 is received.

Data deformat unit 20 takes the symbols produced by receiving modem 18 and reverses the process performed by data format unit 14. Thus, if unit 14 compressed the data, unit 20 uncompresses the data.

It will be appreciated that the received data comprise a plurality of datapoints some of which are inherently redundant. For example, Group 3 facsimile machines use data compression protocols, such as Modified Huffman coding, in accordance with the CCITT recommendation T4. In these protocols, at the end of each scanning line, an EOL indication or datapoint is sent. Additionally, at the end of each page an EOP indication or datapoint is sent.

It is known in the facsimile art that if errors are introduced into compressed received data, one of the following phenomena will occur:

a) illegal code words will be detected by the data deformat unit 20, where illegal code words are code words that the data compression protocol cannot produce; and b) the EOL will be inconsistent with the data. Each received compressed line consists of N pixels. If errors are introduced into the received data, the probability is very low that the number of reconstructed pixels in the line will equal N.

The above-mentioned phenomena can be used to test the quality of data transmitted between facsimile machines.

Other examples of inherent data are:

a) the fact that consecutive lines in an image are inherently correlated;

b) the end of block indications used in CCITT H.261 Standard on videoconferencing, and in Joint Photographic Experts Group (JPEG) or Moving Pictures Expert Group (MPEG) Standards on compression of still and moving images, respectively; and c) error correction bits added to the data for the purpose of error correction. As is known in the apt, these added error correction bits include information about the received data. An example error correction protocol is the High level Data Link Control (HDLC) protocol which utilizes the Cyclic Redundancy Code (CRC) for error detection.

In accordance with a preferred embodiment of the present invention, the error recovery unit 22 utilizes the inherently redundant data point to check that the received data is consistent and thus, has no errors in it. For a redundant data point which is some Function of the original data, this process entails calculating the redundant data point and comparing the calculated value with the received value. IF they match, then the received data is consistent. If not, then errors exist. For transmitted images, the process requires correlating at least two lines in the image. A low value for the correlation typically indicates that there might be errors in the transmitted image.

The consistency check is typically performed on a segment of data, such as a line in a Facsimile transmission. If the consistency check fails, then all symbols received by receiving modem 18 with a low level of confidence will be tested. An example of such a symbol is the symbol produced from phasor Y2 of FIG. 2. Receiving modem 18 will typically define phasor Y2 by symbol V2 since V2 is the closest symbol to phasor Y2; however the match is not very close.

Error recovery unit 22 typically requests from receiving modem 18 an alternative possible symbol For the symbol received with a low level of confidence where an alternative possible symbol is one which is close to the phasor, but not closest. In the example of FIG. 2, V1, although further From Y2 than V2, is the next best, or "second best", symbol for phasor Y2. It is possible to request other available symbols; in the example of FIG. 2, these would be third best symbol V3 or fourth best symbol V4.

Error recovery unit 22 then replaces the alternative possible symbol and repeats the consistency check. If there is consistency in the data, the system proceeds to the next segment of data. If the data is inconsistent, the process is repeated for the next symbol received with a low level of confidence.

It will be appreciated that the present invention performs error recovery as a post-transmission process and does not require changes in the transmission system 10.

It will further be appreciated that the error recovery is generally performed without retransmission and without the need for insertion of error detection data. If, however, it is desired that such error detection be inserted, the present invention utilizes the inserted error detection data for error recovery, as shown in more detail hereinbelow with reference to FIG. 4.

Reference is now made to FIG. 3 which details a preferred embodiment of the operation of the error recovery unit 22 in pseudo-code similar to the software language C. The embodiment of FIG. 3 is by way of example only. Other embodiments are possible and are included within the scope of the present invention.

For each datapoint i in a segment containing end_data number of points, step 50 is performed in which the symbol and phasor are received from the receiving modem 18 and placed into a matrix SP. A test is performed to check the distance of the symbol to the phasor, where the closer the symbol is to the phasor, the better the quality of the symbol.

If the test indicates a large distance between the symbol, sy(i), and its phasor, phasor(i), step 52 is performed in which the second best symbol is calculated as follows: the second best symbol is the symbol in the constellation of possible symbols which is not the closest but the next closest to phasor(i), where the constellation of possible symbols is defined by the type of communication standard used by the receiving modem 18. Closeness is typically defined as the smallest Euclidean distance, but other suitable distance measures can be utilized.

The new value of the symbol is placed into an array called second. A likelihood that the second best symbol, like_sec, is the correct one is also calculated, typically according to the Following Function: the likelihood is defined as the relationship of the distance between the phasor and its second best symbol to the distance of the phasor and its best symbol. Using the example of FIG. 2, the likelihood is defined as:

$$\text{like\_sec} = \text{distance}(Y2, V2)/\text{distance}(Y2, V1) \quad (1)$$

where the distance is typically the Euclidean distance but can be any other suitable distance measure.

It will be appreciated that any other possible likelihood function can be utilized. It will Further be appreciated that a value close to 1.0 indicates a high likelihood that the second best symbol might be the correct answer.

If the test indicates a small distance between the symbol and its phasor, step 54 is performed in which the array second takes on the value of the symbol produced by receiving modem 18 and the likelihood like_sec is set to a very small value.

Steps 52 and 54 lead to a consistency check, performed in step 56, on all of the data up to the present data point. For facsimile machines, the consistency check is typically based on the EOL data point where the number of pixels between two consecutive EOLs must be equal to a known number. For systems transmitting images, the correlation between two consecutive lines in the image must be high.

If the consistency check fails (i.e. there are errors in the received data) step 58 is performed. Step 58 is performed as often as necessary until either the error is corrected or the number of attempts to correct has reached a predefined maximum stored in Max_try.

In step 58 the location of a suspected erroneous symbol is calculated typically according to the following formula: a symbol whose likelihood, like_sec, is greater than s predetermined threshold is defined as a suspected erroneous symbol.

The suspected erroneous symbol is replaced by its second best symbol value as calculated in step 52. The algorithm then performs s consistency check, similar to that performed in step 56. If the replacement does not cause the consistency check to pass, the suspected erroneous symbol is returned to its original value. If the replacement of only one erroneous symbol at a time fails to pass the consistency check, a combination of two or more erroneous symbols may be replaced at a given time in step 58.

If the consistency check passes, the beginning is set to the point where the consistency check passed and the process repeats with the next segment of data.

It will be appreciated that part of the consistency check includes a check that enough datapoints have been received to enable the consistency check to be performed. In the example of facsimile machines, an EOL must be received before the consistency check can be performed.

Reference is now made to FIG. 4 which illustrates an alternative embodiment of the present invention utilizing error detection. Similar reference numerals are used to indicate similar elements.

As in the embodiment of FIG. 1, a transmission system 70 is operative for preparing and transmitting data to be transmitted and a data reception system 72 is operative for receiving the transmitted data and for recovering most of the data into which errors have been introduced.

The transmission system 70 comprises an error detection data inserter 74 For inserting error detection bits, such as CRC parity bits, into the data to be transmitted and transmitting modem 16. A typical error detection data inserter 74 is one operating the HDLC protocol and is typically instantiated in communication software or in communication terminals.

The error detection data inserter 74 inserts error detection bits into the data to be transmitted, in accordance with an error detection algorithm, such as the CRC parity bit algorithm. Inserter 74 also formats the data into packets and possibly also compresses the packets. The resultant data is then sent to transmitting modem 16 which transmits the data to reception system 72.

The reception system 72 comprises receiving modem 18 and an error recovery unit 78, working with information received from receiving modem 18, for recovering data received in error. Error recovery unit 78 typically includes an error detection data extracter 76 for extracting the error detection bits inserted by inserter 74, for detecting errors and for reversing the format operation of inserter 74. An example of inserter 74 is one which performs the HDLC protocol.

Receiving modem 18 receives the transmitted data and sends it to error recovery unit 78. Error recovery unit 78 utilizes extracter 76 to extract the error detection bits and utilizes the extracted bits For error recovery in accordance with the method as described hereinabove, an example of which is illustrated in FIG. 3. In this embodiment the consistency check consists of re-calculating the error detection bits from the received data. For example, if CRC error detection is used, the CRC bit is recalculated for each consistency check.

It will be noted that there is a low probability that the error recovery unit 78 will be unable to detect the erroneous symbols. In such situations, the packet is retransmitted.

It will be appreciated by persons skilled in the art that the present invention is not limited to what has been particularly shown and described hereinabove. Rather the scope of the present invention is defined only by the claims which follow:

I claim:

1. A data reception technique operative in conjunction with a modem, the technique comprising the steps of:
    receiving via a modem a signal comprised of a plurality of datapoints and including therein desired data and inherently redundant data, wherein upon reception of each datapoint, said modem produces quality information regarding how accurately said datapoint was received; and
    identifying and correcting errors in said signal by employing said inherently redundant data and said quality information and wherein said correcting of errors takes place without retransmission of said signal and wherein said step of identifying and correcting includes the steps of:
    identifying a plurality of suspected erroneous datapoints in said signal;
    checking that said inherently redundant data is consistent with said signal wherein an inconsistent result indicates that a first value of at least one of said suspected erroneous datapoints is likely to be incorrect;
    replacing said first value with a second possible value wherein said second possible value is different from said first value thereby creating a modified signal;
    repeating the steps of checking and replacing for at least a portion of the suspected erroneous datapoints until either the modified signal is consistent with the inherently redundant data or no suspected erroneous datapoints remain; and
    returning said at least one suspected erroneous datapoint to said first value if the result of the step of checking is inconsistent.

2. A data reception technique according to claim 1 and wherein said inherently redundant data is one of the following data types: illegal code words, end-of-line (EOL) indications, error detection bits and inherent correlations between lines of a transmitted image.

3. A data reception technique according to claim 1 and wherein said step of identifying and correcting is performed on one segment of data at a time.

4. A data reception technique according to claim 1 and wherein said step of replacing includes the step of replacing said plurality of suspected erroneous datapoints one at a time.

5. A data reception technique according to claim 1 and wherein said step of replacing includes the step of replacing said plurality of suspected erroneous datapoints more than one at a time.

* * * * *